United States Patent [19]

Gozani et al.

[11] Patent Number: 5,098,640

[45] Date of Patent: Mar. 24, 1992

[54] APPARATUS AND METHOD FOR DETECTING CONTRABAND USING FAST NEUTRON ACTIVATION

[75] Inventors: Tsahi Gozani, Palo Alto; Z. Peter Sawa, Oakland; Patrick M. Shea, Sunnyvale, all of Calif.

[73] Assignee: Science Applications International Corporation, San Diego, Calif.

[21] Appl. No.: 463,025

[22] Filed: Jan. 10, 1990

[51] Int. Cl.$^5$ ............................................. G21G 1/06
[52] U.S. Cl. .................................... 376/166; 376/159; 376/165
[58] Field of Search ...................... 376/159, 165, 166

[56] References Cited

U.S. PATENT DOCUMENTS

| | | | |
|---|---|---|---|
| 3,124,679 | 3/1964 | Tittman et al. | 376/159 |
| 3,146,349 | 8/1964 | Jordan et al. | 376/159 |
| 3,767,919 | 10/1973 | Michaelis | 376/159 |
| 3,808,444 | 4/1974 | Schneebarger | 250/492 |
| 3,832,545 | 8/1974 | Bartko | 376/159 |
| 3,997,787 | 12/1976 | Fearon et al. | 376/159 |
| 4,266,132 | 5/1981 | Marshall | 376/159 |
| 4,278,885 | 7/1981 | von Alfthan et al. | 376/159 |
| 4,320,298 | 3/1982 | Buford et al. | 250/358.1 |
| 4,756,866 | 7/1988 | Alvarez | 376/157 |
| 4,851,687 | 7/1989 | Ettinger et al. | 250/390.04 |
| 4,882,121 | 11/1989 | Grenier | 376/159 |

FOREIGN PATENT DOCUMENTS 0227497  7/1987  European Pat. Off. .

OTHER PUBLICATIONS

Drndarevic et al., "A Signal for High Counting Rate Gamma Ray Spectroscopy with NaI(Tl) Detectors", *IEEE Proceedings of Nuclear Science* (Feb. 1988).
Gozani, *Active Nondestructive Assay of Nuclear Materials*, U.S. Nuclear Regulatory Commission, NUREG–CR-0602 SAI-FM-2585 (1981).
Knoll, G. F., *Radiation Detection and Measurement*, John Wiley and Sons (1979).
"Neutron Radiology Takes X-Ray Pictures–with a Difference", *Product Engineering*, vol. 42, No. 12, pp. 38-39 (Jul. 1971).
Smith et al., "Application of a 14 MeV Neutron Source to the Detection of Special Nuclear Material Diversion", *IEEE Transactions on Nuclear Science*, vol. NS-28, No. 2, p. 1637, (Apr. 1981).
Gozani et al.; *Nuclear-Based Techniques for Explosive Detection;* 1986; pp. 398-403; Journal of Energetic Materials, vol. 4; Published in 1986 by Dowden, Brodman & Devine, Inc.

Primary Examiner—Brooks H. Hunt
Assistant Examiner—Frederick H. Voss
Attorney, Agent, or Firm—Fitch, Even, Tabin & Flannery

[57] ABSTRACT

An apparatus and method non-invasively interrogates an object to detect contraband. The apparatus irradiates the object with fast neutrons of energy greater than 6.7 MeV, and measures the ensuing gamma-ray spectra. Irradiation of the object is accomplished by producing a neutron beam and moving the interrogated object stepwise or continuously relative to the beam. The nuclear interactions of highly penetrating neutrons within the irradiated volume of the object give rise to energetic nuclear-species characteristic gamma-rays. The energy and intensity of the emitted gamma-rays provide information relative to the spatial and density distributions of the gamma-ray sources, i.e., the specific atomic nuclei within the object. From this information, three-dimensional images of the atomic nuclei spatial and density distributions are inferred. Such three-dimensional images allow a decision to be made as to the presence of contraband. Measurements are made using arrays of gamma-ray scintillator detectors. A decision analysis based on statistical methods (e.g., discriminant analysis) or an artificial neural system, or other expert system, facilitates a low false alarm rate. One embodiment of the apparatus includes neutron beam collimator means to define and limit the irradiation volume of the object, and auxiliary neutron shielding means to attenuate the neutrons in other than desired neutron beam direction(s). Another embodiment includes an X-ray system and combines electron density information obtained from an X-ray image of the object with the spatial and density distribution information of the gamma-ray sources in order to further enhance the decision analysis.

35 Claims, 5 Drawing Sheets

APPARATUS AND METHOD FOR DETECTING CONTRABAND USING FAST NEUTRON ACTIVATION

This invention was made with Government support under one or more contracts awarded by the Federal Aviation Administration.

BACKGROUND OF THE INVENTION

The present invention relates to nuclear-based contraband detection systems, and more particularly to an apparatus and method for detecting contraband concealed within a container, such as a suitcase, parcel or other object. As used herein, the term "contraband" includes, but is not limited to, explosives, drugs, and alcohol.

There is a pressing need in the airline industry for a system and/or method that expeditiously scans luggage and parcels to detect explosive material. It is obvious that in the use of such a system or method, the probability of explosive detection must be reassuringly high. Furthermore, because of the large number, close to two million pieces of luggage, that are checked and/or carried daily onto aircraft across the country, the occurrence of false alarms should be sufficiently rare in order to avoid nuisance to the public.

There is a similar urgent need in the customs and law enforcement fields for a like system and method that reliably detects other contraband material, e.g., drug hidden within parcels or baggage in transit across international borders. Such a system and/or method must also demonstrate a high probability of detection and a low probability of false alarms.

To meet these challenges, highly sensitive, specific, fast, and non-intrusive detection techniques must be applied. The appropriate nuclear based techniques satisfy these requirements. They provide means for rapid and non-intrusive interrogation of objects and, when properly designed, assure negligible biological hazard.

Diagnostic nuclear techniques in general involve use of two highly penetrating radiations (neutrons and gamma rays) which enable one to detect concealed explosives or other contraband materials. The radiations act as follows: An appropriately fashioned primary radiation excites atomic nuclei within a designated volume of an object. The excited atomic nuclei subsequently relax, emitting electromagnetic or particle radiation that is characteristic of the nuclear species. The analysis of the emitted spectrum thus facilitates the detection of a particular substance within the object, e.g., explosives or illegal drugs. That is, if the emitted spectrum includes radiation of a given energy, then the presence of a particular element within the object can be inferred. Thus, a particular spectrum showing characteristic radiation lines of particular intensities serves as a "signature" that identifies the presence of a particular chemical element within the object being examined. Identifying the chemical elements and/or chemical compounds within an object thus involves identifying the corresponding signatures that are present in the radiations emitted from the material as described, e.g., in Gozani, *Active Nondestructive Assay of Nuclear Materials*, United States Nuclear Regulatory Commission, NUREG-CR-0602, SAI-FM-2585 (1981).

It is common practice to use neutrons as the primary radiation and to measure the ensuing gamma-ray spectra for the non-intrusive diagnostic purposes. U.S. Pat. No. 3,832,545 and patent application Ser. No. 07/053,950, filed 05/26/87, for example, disclose nuclear-based explosive detection systems that make use of neutrons of mainly thermal energies. In contrast, European Patent publication EP-O-227-497-A1 discloses a nuclear-based explosive detection system wherein fast neutrons of energies from 7 to 14 million electron volts (MeV) are employed. Disadvantageously, the thermal neutron based detection systems provide, for practical purposes, primarily only one signature of the four cardinal constituents of explosives (i.e., the elements hydrogen, carbon, nitrogen, and oxygen), namely the signature of nitrogen (and possibly hydrogen). The fast neutron based detection system, on the other hand, may provide signatures of all four ingredients of explosives, or other contraband, thus enhancing the interrogating power of the fast neutron contraband detection systems.

It must be observed, however, that simply obtaining the signatures of the constituent elements of a specified contraband does not necessarily indicate that such contraband is present in the object under investigation. This is because many benign materials (non-contraband) also include such elements. A great diagnostic advantage may thus be obtained when a three-dimensional image of the distribution of element densities within the interrogated body is also formed, as such image may help further distinguish contraband from non-contraband. A suitable three-dimensional image for this purpose may advantageously be obtained by performing a section-by-section neutron irradiation of the object, and by performing a computer-based analysis of the energy and intensity of the signals that are produced from each section. Such analysis requires the judicious positioning of gamma-ray detectors around the object, as taught in Applicants' earlier patent application, Ser. No. 07/053,950, filed 05/26/87, which application is incorporated herein by reference.

A viable contraband detection system should meet several requirements. These requirements include: (1) the detection of explosives or other contraband should be independent of the specific configuration of the explosive or contraband (i.e., the explosive or other contraband must be detected regardless of its shape); (2) the examination of the object must be non-intrusive in order to assure maximum privacy of the contents of the object under investigation and maximum throughput of objects through the system; (3) the detection system must provide a high probability of detection, i.e., a high detection sensitivity, and a low rate of false alarms; (4)the detection technique must be non-hazardous to the objects being interrogated, the operating personnel, and the environment; and (5) the detection system must be reliable, easily operated and maintained, and capable of functioning in a variety of environments.

It is noted that non-nuclear explosive detection systems are also known in the art, some of which are mentioned in the above-cited patent application. However, to date, these non-nuclear systems by themselves have not been able to comply with the above requirements.

Nuclear-based explosive detection systems, on the other hand, are able to address most of the needs of a viable detection system as set forth above, but existing nuclear-based systems still fall short in some areas. The present invention advantageously addresses specific improvements in the nuclear-based detection field that overcome the shortcomings of the prior art systems. Such improvements can be better appreciated and understood by first reviewing the relevant properties of explosives, and then assessing the shortcomings of the prior art detection systems in detecting such explosives. (It is to be emphasized, of course, that explosives are just one example of a particular type of contraband that could be detected using the present invention.)

Explosives may generally be divided into 6 types:
1) Nitroglycerine based dynamite,
2) Ammonium nitrate based dynamite,
3) Military explosives (Composition-4, TNT, PETN, and picric acid),
4) Homemade explosives (made, e.g., of fertilizer, fuel oil),
5) Low order powders (e.g., black, and smokeless powder), and
6) Special purpose explosives (e.g., lead azide, lead styphanate, mercury fulminate, and blasting gel).

The physical properties and the elemental compositions of these explosives are summarized Table 1. One finds that the nominal density of explosives is typically 1.6 g/cm$^3$ and ranges from 1.25 g/cm$^3$ to 2.0 g/cm$^3$ and more, and the predominant elemental components are hydrogen, carbon, nitrogen, and oxygen. Reading Table 1, one should keep in mind that an explosive must have a minimum propagation thickness in order to be effective, thus requiring minimum sizes of contiguous explosive bodies.

U.S. Pat. No. 4,756,866 (Alvarez) teaches an explosive detection system that uses an inert tracer, e.g., deuterium, implanted in explosives at the time of their manufacture. The illicit traffic in explosives is then detected by irradiating the luggage and parcels with photons of energy greater than 2.223 MeV and detecting neutrons resulting from the photo-disintegration of the implanted deuterons. The main drawbacks of this approach are (1) a global consent among manufacturers of explosives would be required to add adequate amounts of deuterium to the explosives, and (2) some explosives, e.g., black powder (which contains no hydrogen) and the homemade explosives, would escape detection.

Another nuclear technique suggested in the art for detecting explosives involves recognizing that nitrogen is the major component in explosives, see Table 1, and then using the production of radioactive $^{13}$N ($t_{\frac{1}{2}}=10$ m, positron emitter) in the $^{14}$N($\gamma$,n) process, induced by photons of energy greater than 10.6 MeV, and the subsequent detection of annihilation radiation (facilitating the positron emission tomography), to identify the presence of nitrogen. However, the prohibitive factor associated with this technique is the large radiation doses (on the order of krad/kg) that are inevitably delivered to the irradiated objects, which radiation doses create an unacceptable hazard to the public.

A related nuclear technique that overcomes, or at least minimizes, the aforementioned radiation problem is based on activation of nitrogen with thermal neutrons, as taught, e.g., in the aforementioned U.S. Pat. No. 3,832,545 (Bartko) and the above-cited U.S. patent application Ser. No. 07/053,950 (the '950 application). Both inventions draw heavily on the fact that the $^{14}$N(n,$\gamma$) process, initiated with slow neutrons, may give rise to prompt gamma-ray photon emission of precisely 10.8 MeV, thus greatly facilitating its detection. While sharing this basic premise, however, the embodiments of these two inventions differ substantially. For instance, in the Bartko patent, organic scintillators are used as gamma-ray detectors, with the result that a rather moderate source position resolution (i.e., a poor image of the nitrogen distribution), and a low detection efficiency are obtained.

The '950 application, on the other hand, teaches the use of judiciously positioned arrays of inorganic scintillators, e.g., NaI(Tl), viewing the moving objects that are immersed in the bath of thermal neutrons. A computer-based analysis of the measured spectra from the individual detectors provides a quite good three-dimensional image of the nitrogen density in the object, thus facilitating, in principle, the detection of concealed explosives. Explosive detection systems developed from the invention described in the '950 application have, in fact, satisfied the Federal Aviation Agency (FAA) requirements for explosive detection in 1989, and are currently being tested at selected airports.

However, even the invention described in the '950 application is not free from two systemic deficiencies. First, the thermal neutron bath is not homogeneous, since the thermal neutrons tend to be depleted by the object material. Accordingly, the nitrogen detection efficiency is diminished in the inner part of the object volume. Secondly, an inference of presence of the explosive in an object merely due to an elevated density of nitrogen alone is bound to cause frequent false alarms. (Refer, for example, to the nitrogen content in wool, leather, food stuff and other benign commodities included in Table 1.)

Fortunately, however, the study of the performance of the embodiment of invention described in the '950 application provided the impetus for the present invention, which invention advantageously ameliorates the cited shortcomings inherent to the Bartko invention and the deficiencies of the invention described in the '950 application.

A still further prior art nuclear-based technique for detecting explosives is referenced in European patent publication EP O-227-497-A1. This document describes an explosive detection system based on inelastic scattering of 7-14 MeV (fast) neutrons. The fast neutrons are produced in the $^3$H(d,n)$^4$He reaction with a pulsed deuteron beam, and the prompt gamma-rays due to the neutron interactions are detected with a solid state diode [HPG], outputs of which are appropriately timed. An analysis of the prompt gamma-ray spectra provides an indication of the concentrations of elements in the irradiated objects. In particular, it is stated that the measurement of the ratio of the intensities of the prompt gamma-ray transitions in $^{14}$N to the intensities of transition(s) in $^{16}$O yields information regarding the presence of explosive materials.

Although the specifics of the fast neutron invention described in the European patent document are very scant, from the description given it appears that the nitrogen to oxygen ratio is used as the sole indicator of the presence of an explosive material, and the carbon signal is ignored. This appears to be due to the fact that the carbon signal is represented by a very broad line in the radiation spectrum, caused by the considerable recoil velocity of carbon nuclei and the short lifetime of the 4.44 MeV level in $^{12}$C, and this broad line is difficult to measure using high resolution solid state detectors of the type proposed.

Another deficiency associated with the fast neutron device cited in the European document appears to be the necessity of using rather long irradiation times of the objects under examination, resulting in a relatively slow throughput time of the explosive detection system. This long irradiation time is due in large part to the inherently low detection efficiency of the high resolution solid state gamma-ray detectors, created by two technical limits of these detectors: (1) the relatively small active volumes (e.g., less than 100 cm$^3$) of the detectors, and (2) the upper bandwidth of the detectors, resulting in maximum count rates less than 10$^5$ Hz. What is needed therefore is a fast neutron system that is not encumbered by these detection limitations.

Even if a fast neutron system is obtained that overcomes these identified deficiencies, however, there are still other adverse affects associated with the use of fast neutrons that must be addressed before a viable contraband detection system based on fast neutron activation may be realized. For example, the energy resolution of gamma-ray detectors of intrinsic germanium deteriorates after a fluence of $\approx 10^{10}$ n/cm$^2$ of fast neutrons, and a detector annealing cure must be applied or detectors replaced. The invention disclosed in the European patent document teaches, for example, the use of a shadow shield of tungsten and borated polyethylene in order to reduce this neutron dose. However, assuming the length of the indicated shadow bar to be 0.5 m, it is estimated that this amount of shielding will result in an attenuation factor greater than $2.6 \times 10^{-3}$. At this level of attenuation, and assuming that a d+T neutron source of yield of 10$^{12}$ n/second is employed, it can be shown that the availability of the detector unit will be limited to less than 47 hours. Unfortunately, this is an unacceptably short time for a viable contraband detection system.

TABLE 1

Various Physical Properties and Approximate Composition of Explosives and Other Materials

| MATERIAL | PHYSICAL STATE | DENSITY (G/CM$^3$) | % Weight Composition | | | | | |
|---|---|---|---|---|---|---|---|---|
| | | | H | C | N | O | OTHER | O + N |
| Nitroglycerine (NG) | Liquid | 1.6 | 2.2 | 15.9 | 18.5 | 63.4 | 0 | 81.9 |
| EGDN | Liquid | 1.48 | 2.4 | 22.0 | 17.1 | 58.5 | 0 | 75.6 |
| Amn. Nitrate | Solid | 1.7 | 5.0 | 0 | 35.0 | 58.0 | 0 | 93 |
| Black Powder | Solid | 1.7–1.95 | 0 | ~22 | 10 | 36 | S(3),K(29) | ~46 |
| Nitrocellulose (9–14% N) | Solid | 1.50–1.7 | 2.4 | 24.3 | 14.1 | 59.2 | 0 | 73.3 |
| PEIN (Pure) | Solid | 1.76 | 2.4 | 19.0 | 17.7 | 60.7 | 0 | 78.4 |
| PEIN (Data Sheet) | Solid | 1.48 | 4.3 | 31.4 | 12.2 | 52.1 | 0 | 64.3 |
| TNT (Pressed) | Solid | 1.63 | 2.2 | 37.0 | 18.5 | 42.3 | 0 | 60.5 |
| Composition B | Solid | 1.71 | 2.7 | 24.4 | 30.5 | 42.7 | 0 | 73.2 |
| Lead Styphnate | Solid | 3.02 | 0.7 | 15.4 | 9.0 | 30.8 | Pb: 44.2 | 39.8 |
| Tetryl | Solid | 1.57–1.71 | 1.8 | 29.3 | 24.4 | 44.6 | 0 | 69 |
| Dynamite | Solid | 1.25 | 4.0 | 14.0 | 15.–20 | 59.0 | Na: 10.0 | 74–79 |
| Octogen (HMX) | Solid | 1.90 | 2.8 | 16.2 | 37.8 | 43.2 | 0 | 81 |
| Composition 3 (C-3) | Putty-like Solid | 1.58–1.62 | 2.9 | 22.8 | 32.8 | 41.6 | 0 | 74.4 |
| Composition 4 (C-4) | Putty-like Solid | 1.64–1.66 | 3.6 | 21.9 | 34.5 | 40.2 | 0 | 74.7 |
| Picric Acid | Solid | 1.76 | 1.3 | 31.4 | 18.3 | 48.9 | 0 | 67.3 |
| Lead Azide (Detonator) | Solid | 4.48 | 0 | 0 | 28.9 | 0 | Pb | 28.4 |
| Triacetone Triperoxide | Solid | 1(?) | 9.7 | 38.7 | 0 | 51.6 | 0 | 59.7 |
| Hexamethylene Triperoxide Diamine | Solid | 1.57 | 5.77 | 34.6 | 13.5 | 46.2 | 0 | 59.7 |
| NON EXPLOSIVE | | | | | | | | |
| Packed Clothes | Solid | <0.1 | | | | | | |
| Polyester | Solid | (1.38) | 3.7 | 66.7 | 0 | 29.6 | 0 | 29.6 |
| Dacron | Solid | (1.38) | 4.2 | 62.5 | 0 | 33.3 | 0 | 33.3 |
| Cotton | Solid | (1.30) | 6.0 | 48.0 | 0 | 46.0 | 0 | 46.0 |
| Wool | Solid | (1.32) | 4.7 | 37.5 | 21.9 | 5.1 | 0 | 27.0 |
| Silk | Solid | (1.25) | 5.3 | 39.5 | 28.8 | 26.3 | 0 | 55.1 |
| Nylon | Solid | (1.14) | 9.7 | 63.7 | 12.4 | 14.2 | 0 | 26.6 |
| Orlon, Acrylan | Solid | (1.16) | 5.7 | 67.9 | 26.4 | 0 | 0 | 26.4 |
| Other Materials | | | | | | | | |
| ABS (Acetonitrile Butadiene Styrene) | Solid | 1.20 | 8.92 | 84.5 | 76.5 | 0 | 0 | 76.5 |
| Melamine-Formaldehyde | Solid | 1.48 | 5.5 | 43.6 | 50.9 | 0 | 0 | 50.9 |
| Neoprene (Wet Suites) | Solid | 1.25 | 4.4 | 64.0 | 0 | 0 | Cl: 31.6 | 0 |
| Polyurethane | Solid | 1.50 | 7.9 | 52.2 | 12.2 | 27.8 | 0 | 40 |
| Polyethylene | Solid | 0.92–0.96 | 14.3 | 85.7 | 0 | 0 | 0 | 0 |
| Polypropylene | Solid | 0.89–0.91 | 14.3 | 85.7 | 0 | 0 | 0 | 0 |
| Lucite, Acrylic Plexiglass | Solid | 1.16 | 9.1 | 54.6 | 0 | 36.4 | 0 | 36.4 |
| PVC | Solid | 1.2–1.55 | 4.8 | 38.4 | 0 | 0 | Cl: 56.8 | 0 |
| Saran | Solid | 1–1.7 | 3.1 | 30.0 | 0 | 0 | Cl: 66.9 | 0 |
| Water | Liquid | 1 | 11.1 | 0 | 0 | 89.9 | 0 | 89.9 |
| Ethyl Alcohol | Liquid | 0.79 | 13.1 | 52.1 | 0 | 34.0 | 0 | 34.0 |
| Sugar | Solid | 1.59 | 6.5 | 42.0 | 0 | 51.4 | 0 | 51.4 |

SUMMARY OF THE PRESENT INVENTION

The present invention makes use of the well known principle that interactions of fast neutrons with atomic nuclei give rise to prompt gamma-ray lines that are unique signatures of the nuclear species. By properly measuring these gamma-ray spectra one can obtain a non-invasive means indicating the density of the gamma-ray sources, i.e., the density of the atomic nuclei of elements that constitute the irradiated object.

To this end, the present invention is directed to an apparatus and method for interrogating an object with fast neutrons of energy greater than 6.7 MeV, and measuring the ensuing gamma-ray spectra to detect contraband, such as explosives. The apparatus of the invention includes: (1) means for producing a neutron beam; (2) means for moving the interrogated object stepwise or continuously relative to the beam, whereby the nuclear interactions of the highly penetrating neutrons within the irradiated volume of the object give rise to the characteristic gamma-rays; (3) measurement means for determining the energy and intensity of the resulting gamma-rays; and (4) processing means for: (a) generating three-dimensional images of the distributions of the gamma-ray sources, and (b) determining whether the distributions of sources indicate the presence of specified contraband.

The method of the present invention includes: (a) generating a beam of fast neutrons; (b) irradiating an object to be investigated with the beam of fast neutrons in order to produce a gamma-ray spectra having spectral lines characteristic of the elements contained within the object; (c) measuring the spectral lines of the gamma-ray spectra to determine the density and distribution of the atomic nuclei of the elements contained within the object; (d) comparing the measured density and distribution of the atomic nuclei of the elements within the object with the known density and distribution of the atomic nuclei of the elements characteristic of contraband; and (e) determining that contraband is present within the object when the comparison indicates a substantial match.

The preferred application of the present invention is directed to the detection of concealed explosives in luggage or baggage being loaded onto airplanes. However, numerous other applications also exist, as all contraband material produces a characteristic gamma-ray spectra that are emitted from an object being examined when irradiated with the fast neutrons.

In operation, fast neutrons from a suitable fast neutron source are directed to the examined object, e.g., luggage, or other container, where the neutrons are allowed to interact with the atomic nuclei of the elements within the object. A conventional conveyor belt, or equivalent system, is used to move the object in front of the neutron beam, thereby controlling the volume of the object that is irradiated. In one embodiment, the source of fast neutrons may include a neutron beam collimator to define and limit the irradiation volume of the object, and an auxiliary neutron shield to attenuate the neutrons in other than desired neutron beam direction(s). Advantageously, by combining the collimation of neutrons into, e.g., a fan beam with the steady or stepwise motion (via conveyor) of the object in front of the neutron beam, and by employing arrays of gamma-ray detectors as described below, a three dimensional mapping of the nuclear densities is achieved.

The measurement means, or method of measuring, associated with the invention includes arrays of gamma-ray detectors that allow a high throughput of interrogated items to be maintained. The gamma-ray detectors are preferably scintillation crystals coupled to photomultipliers. This combination allows the resulting gamma-ray spectra to be measured with sufficient energy resolution to accurately ascertain the presence and intensity of the gamma-ray lines that are signatures of, e.g., hydrogen (H), carbon (C), nitrogen (N), oxygen (O), and, in some instances chlorine (Cl). Such detectors are coupled to appropriate processing circuitry, which circuitry converts the signal pulses put out by the photomultipliers to digitized pulses suitable for computer processing. (A pulse put out by a photomultiplier indicates the detection of a particular gamma-ray, with the height of the pulse providing an indication of the energy of the gamma-ray.)

In addition to the arrays of gamma-ray detectors mentioned above, the measurement means preferably also includes at least one neutron detector positioned on the side of the object being irradiated opposite the neutron source. Such neutron detector advantageously measures those neutrons that pass through the object, thus providing an indication of the density of atomic nuclei within the object similar to conventional neutron radiography techniques.

The processing means include a decision analysis based on statistical methods (e.g., discriminant analysis) or an artificial neural system, or other expert system. Such processing facilitates a low false alarm rate. Unlike the prior art thermal neutron detection system, where only one elemental signature, e.g., of nitrogen, is obtained from the irradiated object, the processing means of the present invention focuses on the occurrence of multiple unique signatures of the light elements, e.g., H, C, N, O, and (in some instances) Cl. It is the occurrence of a particular combination of these elements that characterizes the composition of a particular contraband material, e,g, explosives. Thus, the presence of contraband within the object under investigation is better ascertained by determining the occurrence of the combination of the referenced light elements. This determination is further enhanced by including an analysis of the densities and three-dimensional distributions of such elements as obtained from the arrays of gamma-ray detectors and the neutron detector(s).

As indicated, the ultimate contraband/non-contraband decision is based on statistical methods, such as a statistical discriminant analysis; or alternatively, by employing an electronic neural network, trained on large pools of objects with varying contents. Either type of processing, or a combination of both types of processing, may be readily carried out using one or more programmable digital computers, thereby securing a high probability of detection of contraband while assuring a low frequency of false alarms, and while further maintaining a high degree of flexibility in the manner in which the processing is effectuated.

In an alternative embodiment of the invention, a conventional X-ray system is added to the nuclear explosive detection system in order to produce an ordinary electron density image of the luggage or other parcel and its contents. A simple knowledge-based algorithm then incorporates both the nuclear and the electron density distributions in order to enhance the performance of the total detection system.

It is a primary feature of the present invention to provide a nuclear-based non-invasive detection system that can accurately and rapidly determine the presence of concealed contraband, such as explosives, within a closed object.

It is another feature of the invention to provide such a detection system that accurately identifies the presence of hydrogen, oxygen, carbon and/or nitrogen, including a three-dimensional distribution of such elements, within the object being investigated.

Yet another feature of the invention provides for the detection of contraband within a closed object regardless of the shape of the contraband within the object, thereby allowing, for example, sheet explosives to be detected as well as more conventional cylinder-shaped explosives.

Still another feature of the invention provides for a contraband detection system that yields a high probability of detecting specified contraband within the closed objects subjected thereto, while at the same time ensuring a low probability of false alarms, all while maintaining a high throughput of objects through the system.

A further feature of the invention provides a nuclear-based contraband detection system that is easy and safe to operate, the system being non-hazardous to the interrogated objects, operating personnel, and the environment.

BRIEF DESCRIPTION OF DRAWINGS

The above and other features and advantages of the present invention will be facilitated with reference to the following exemplary description thereof presented in connection with the accompanying drawings, wherein.

DETAILED DESCRIPTION OF THE INVENTION

The following description is of the best mode presently contemplated of carrying out the invention. This description is not to be taken in a limiting sense, but is made merely for the purpose of describing the general principles of the invention. The scope of the invention should be determined with reference to the claims.

For the sake of greater clarity in the description of the present invention, a particular embodiment providing for the fast detection of concealed explosives is described. However, embodiments of the present invention in the detection/control of other substances/-materials are easily carried out by those skilled in the art of nuclear spectroscopy using the herein described apparatus and methods. For example, any material having a characteristic radiation "signature" (e.g., resulting from a specific combination, concentration, and/or arrangement of elements) as a result of inelastic scattering of fast neutrons, could be identified using the methods and apparatus described herein.

The present invention is based on the phenomenon that fast neutrons of MeV energies induce prompt gamma-ray transitions from the low lying levels in target nuclei. Advantageously, the corresponding cross sections are reasonably large, and for instance in the case of $^{12}C$, $^{14}N$, and $^{16}O$ are greater than the neutron radiative capture cross sections at thermal neutron energies. However, because the neutron incident energy must exceed the excitation energy of the nuclear level to be excited, the neutrons must have energies greater than, e.g., 6.7 MeV if measurements of the gamma-ray transitions in $^{16}O$ with 14 MeV neutrons are contemplated. Rising the neutron energy too high is counter-productive because the number of the reaction channels increases rapidly, thereby often causing reduction of the desired cross section, and also initiating the production of many undesirable delayed radioactivities as a side effect. However, for practical reasons, it is preferable to use, e.g., 14 MeV neutrons, as the input beam in the gamma-ray spectrometry analysis performed by the present invention. Advantageously, there are readily available generators of 14 MeV neutrons, and the production of the desired gamma-ray lines is satisfactory at this bombarding neutron energy. Also, there is available a great body of evaluated data on interactions of 14 MeV neutrons with nuclei, which facilitates the assessment of the densities of the target nuclei and the design of efficient biological shielding for use with the 14 MeV neutrons.

Figure 1:
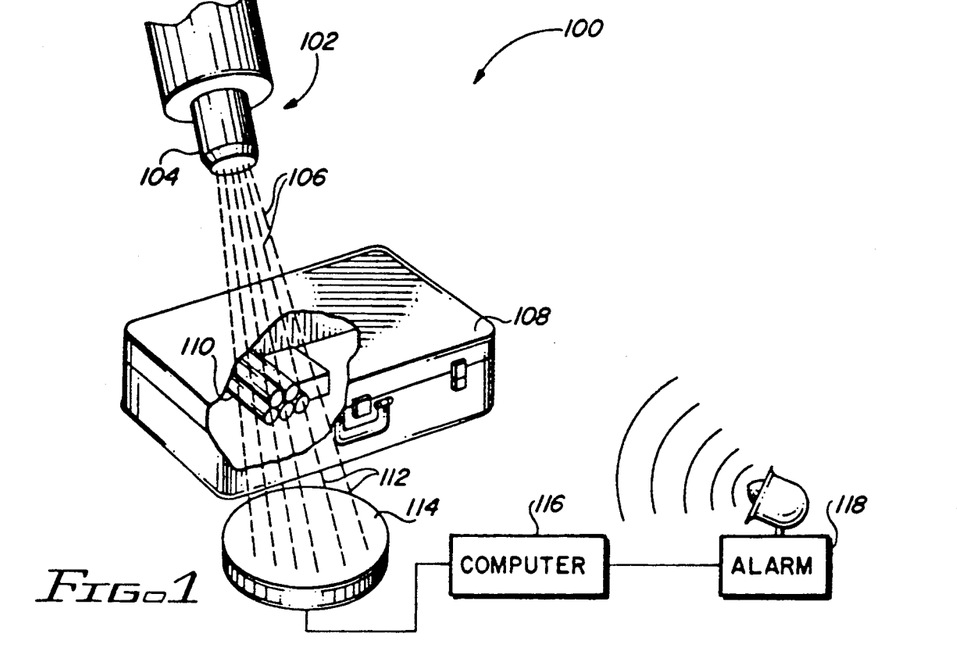
FIG. 1 is a simplified schematic diagram of a nuclear-based contraband detection system.

As an overview of the present invention, reference is made to FIG. 1, where a simplified schematic diagram of a nuclear-based explosive detection system 100 is illustrated. The system includes a neutron generator (ion accelerator) source 102 that produces beams of neutrons 106. The neutron source 102 may include a collimator 104, or equivalent structure, that directs the neutron beams 106 towards a desired object, such as luggage 108, so as to irradiate a specified section of the luggage with neutrons. The probing neutrons interact with the explosive material 110, placed inside the luggage 108, and induce it to emit gamma rays. The number and energies of the emitted gamma rays are measured in a detector 114.

Certain elements of interest, such as hydrogen (H), carbon (C), oxygen (O) and nitrogen (N), show up in the energy spectrum as peaks (lines of interest) at particular positions in the measured spectrum. By using appropriate processing circuits, the presence or absence of such energy peaks is monitored using a computer 116. If prescribed signatures of such elements are found to be present within at least one particular small subsection of luggage volume, or "voxel", of the luggage 108, such finding suggests that explosives are present in that voxel of the luggage. In such instance, an alarm 118 is triggered. This alarm (which may be audio and/or visual) alerts operating personnel that explosive material 110 may be present within the luggage 108.

Advantageously, by limiting the triggering or sounding of the alarm only to situations where specific combinations and densities of prescribed elements are present, as determined by appropriately monitoring and processing the spectrum of the gamma rays, a high probability of detection (PD) of the explosive material can be obtained while maintaining a low probability of false alarms (PFA).

The above description (presented in connection with FIG. 1) is, of course, greatly simplified. Nonetheless, it illustrates to those less familiar with gamma-ray spectroscopy the manner in which the present invention non-invasively detects a specified type of contraband, such as explosives, within a closed object.

Figure 2:
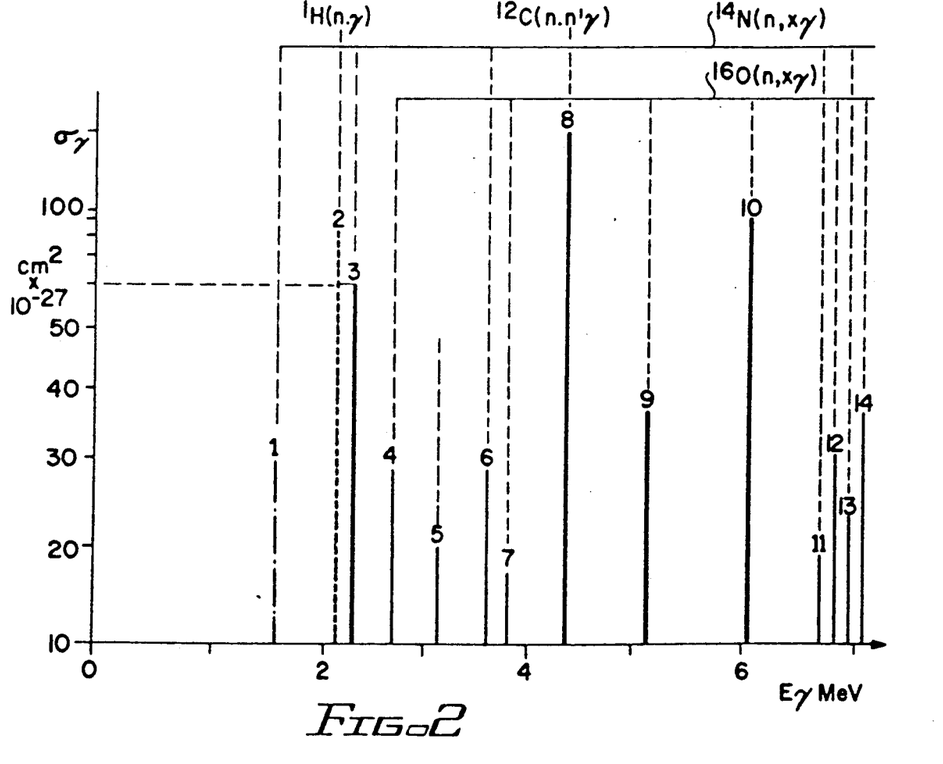
FIG. 2 is a schematic spectrum of prominent gamma-rays with energies greater than 1 MeV that are emitted in bombardments of hydrogen, carbon, nitrogen and oxygen with a steady beam of 14 MeV neutrons.

For those having more familiarity with gamma-ray spectroscopy, reference is next made to FIG. 2 where there is shown a schematic spectrum of prominent gamma-rays with energies greater than 1 MeV that are emitted in bombardments of hydrogen, carbon, nitrogen and oxygen with a steady beam of 14 MeV neutrons. The cross sections of these atomic nuclei for the production of the indicated gamma-ray lines are plotted on the logarithmic scale in units of $10^{-27}$ cm$^2$ (millibarns). (The concept of nuclear cross sections is well understood by those skilled in nuclear spectroscopy, and is fully described in the literature, see, e.g., Gozani, *Active Nondestructive Assay of Nuclear Materials, supra*, at pages 36–40.) The spectral lines labelled 1, 3, 6, 8 (minor part), 9, 11, and 13 are due to nitrogen. The spectral lines labeled 4, 5, 7, 10, 12, and 14 are due to oxygen. The spectral line 8 is due to carbon. Similarly, the spectral line labeled 2 is due to hydrogen, this line resulting from radiative capture of neutrons by hydrogen. (Note, that the intensity of this particular line is set arbitrarily in FIG. 2.)

To illustrate the manner in which the information presented in FIG. 2 is to be read, a basic understanding of the manner in which nuclear interactions occur and the corresponding measurements are made is helpful. The relevant literature fully documents such interactions and measurement techniques, see, e.g., Gozani, *Active Nondestructive Assay of Nuclear Materials. Principles and Applications, supra*; Knoll, G. F., *Radiation Detection and Measurement*, John Wiley & Sons (1979). When a neutron enters a given material, e.g., nitrogen, it has some probability to collide with an atomic nucleus, depending upon the cross section of target nucleus and the neutron incident energy. A gamma-ray is emitted only when a given amount of energy is transferred to the target nucleus. Appropriate detectors can be positioned to absorb such gamma-rays and to measure their energy. The probability that an interaction will occur (and hence the probability that a gamma-ray will be emitted) significantly increases with the fluency of neutrons.

Thus, with reference to FIG. 2, the heavy spectral lines, e.g., lines 2, 3, 8, 9 and 10 reflect the fact that gamma-rays with the indicated energies are more likely to occur when the identified elements having the indicated nuclear cross sectional areas are bombarded with 14 MeV neutrons. The lighter spectral lines, e.g., lines 1, 4, 5, 6, 7, 11, 12, 13 and 14, indicate that gamma-rays at the indicated energy levels may also occur, but not as frequently. Said another way, most of the gamma-rays emitted from hydrogen, carbon, nitrogen and oxygen when irradiated with 14 MeV neutrons will appear as strong spectral lines 2, 3, 8, 9, and 10; while lines 1, 4, 5, 6, 7, 11, 12, 13 and 14 will be rather weak, or not measurable for technical reasons.

Figure 3A:
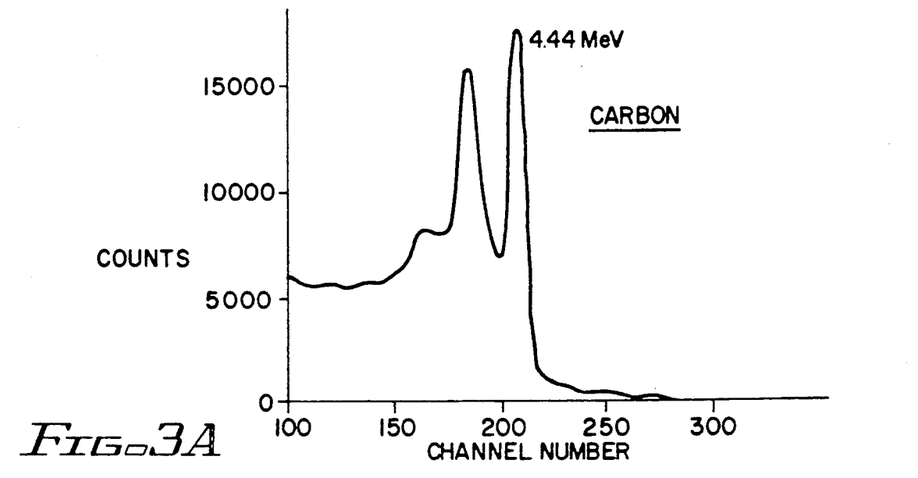
FIGS. 3A-3C are representative energy spectra obtained from various materials that have been irradiated with a beam of 14 MeV neutrons.
Figure 3B:
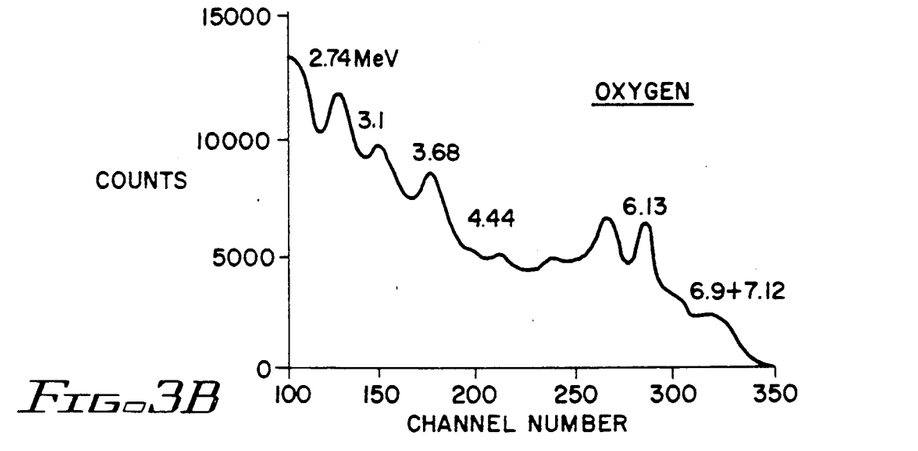
Figure 3C:
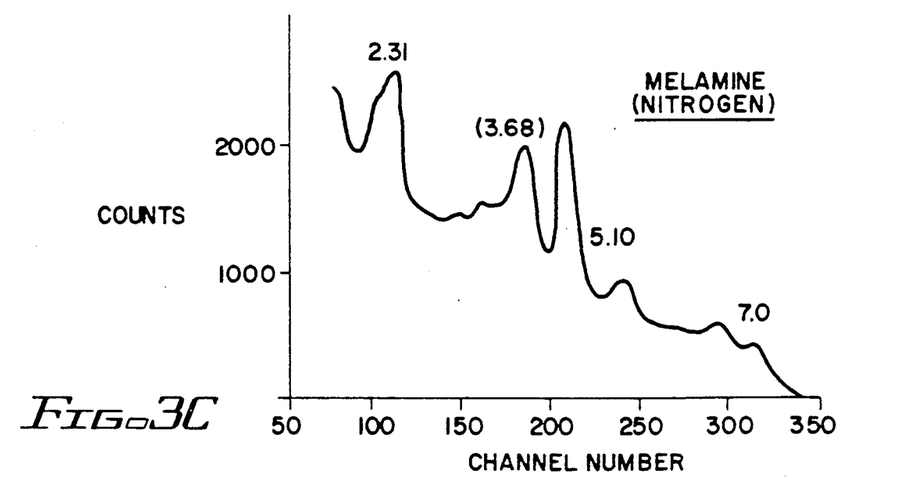

In contrast to FIG. 2, which shows a schematic spectrum of emitted gamma-rays from carbon, hydrogen, nitrogen and oxygen that would be measured assuming ideal measuring equipment and conditions, FIGS. 3A through 3C show actual gamma-ray spectra measured using realistic (non-ideal) measuring equipment and conditions when various samples, many of which contain combinations of hydrogen, nitrogen, carbon, and/or oxygen, are irradiated with 14 MeV neutrons. Note that the vertical axis of the spectra shown in FIGS. 3A through 3C is measured in "counts", where one count indicates the detection of a pulse (due to gamma ray interaction in a scintillator detector) of the particular energy indicated on the horizontal axis. These figures are useful to show the versatility of the present invention in being able to identify the "signatures" of different types of contraband. (Here, a "signature" of a material comprises the characteristic types, intensities, and energies of the radiation, e.g. gamma-rays, emitted by that material when irradiated with fast neutrons.) These figures also illustrate the difficulty in recognizing a specified signature due to background or instrumental noise that appears in the spectrum.

Figure 4:
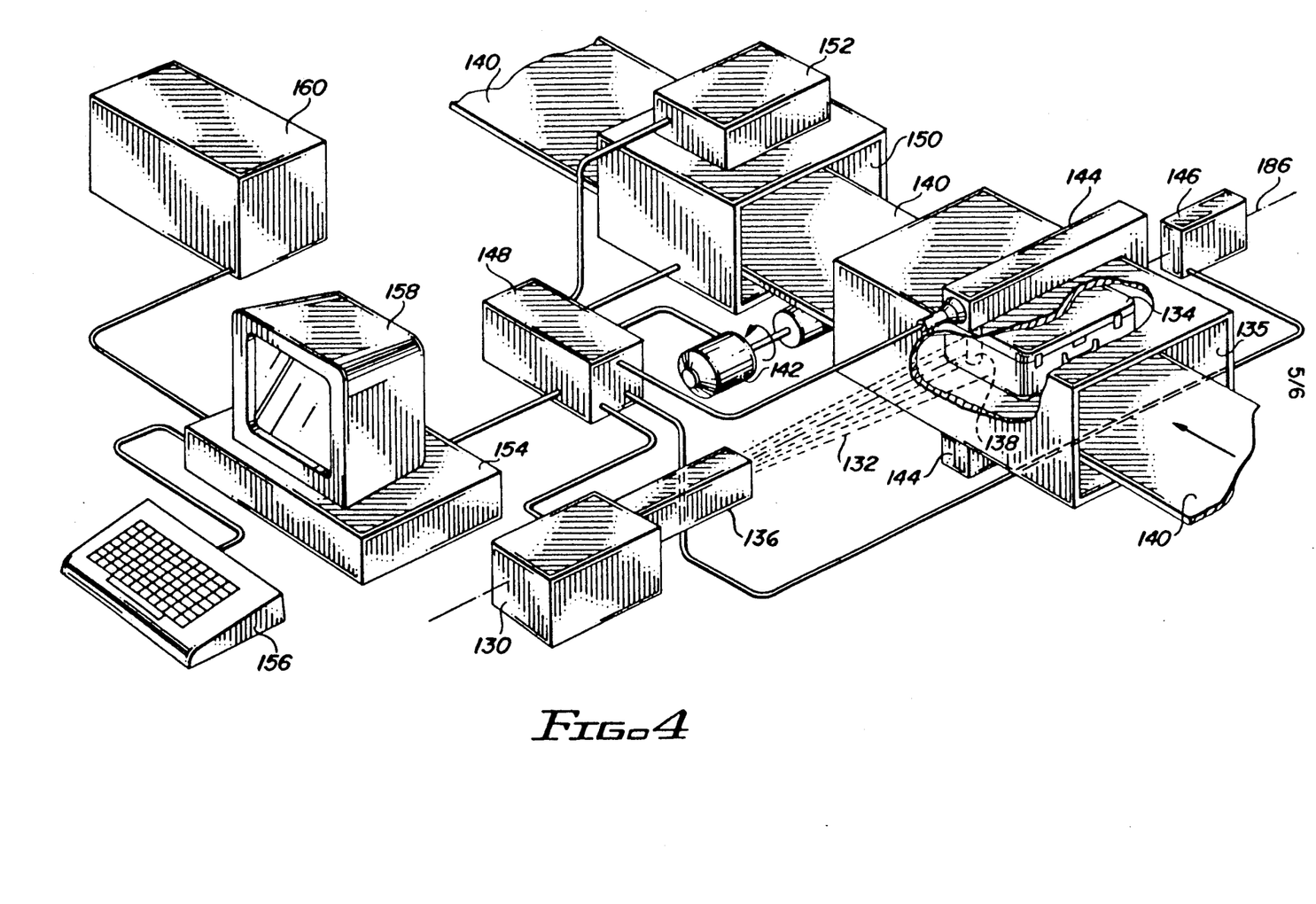
FIG. 4 illustrates a schematic representation of the principal hardware components that may be included in a contraband detection system in accordance with one embodiment of the present invention.

Referring next to FIG. 4, a schematic representation of the principal hardware components that may be included in a contraband detection system in accordance with one embodiment of the present invention is illustrated. A source of fast neutrons 130 directs a beam 132 of neutrons towards an object 134, the contents of which are to be investigated. In a preferred embodiment, a collimator 136 shapes the neutron beam 132 to assume a desired cross sectional shape at the point where it strikes the object 134. As shown in FIG. 4, for example, the cross sectional shape of the beam 132 may assume that of a narrow rectangle 138 at the point where it strikes the object 134.

The object 134 is carried past the beam 132 within a shielded chamber 135 on a conveyor belt 140, or equivalent parcel-carrying mechanism. The conveyor belt 140 is driven by a motor 142 in a continuous or step-wise fashion. The conveyor belt 140 continues to carry the object 134 through a chamber of a conventional X-ray system 150 wherein a source of X-rays 152 and a corresponding detector (not shown) are used to produce an ordinary electron density image of the object and its contents.

It is noted that while the X-ray system 150 is shown as a separate system from the nuclear portion of the invention (e.g., chamber 135), such physical separation is shown only for clarity. A particular embodiment of the invention may include the nuclear and X-ray portions of the invention within the same physical housing.

An array 144 of gamma-ray detectors are selectively positioned around the object 134 as it is irradiated by the neutron beam 132 within the nuclear chamber 135. In one embodiment, this array forms a C-ring that surrounds three sides of the object as it is irradiated, as shown in FIG. 4. (Note in FIG. 4 that only an upper portion of the C-ring detector array 144 is visible.) An alternative embodiment, refer for instance to FIG. 5B, utilizes arrays of detectors that form bars positioned "fore" and "aft" of the interrogated sample. Still other embodiments utilize a detector array that comprises a full ring that completely surrounds the object as it is irradiated. In addition to the array of gamma-ray detectors 144, at least one neutron detector 146 is placed behind the object 134 in alignment with the source of neutrons 130. This neutron detector 146 thus registers mainly neutrons that manage to pass through the chamber 135 and the object 134 without interacting substantially with any intervening atomic nuclei.

Appropriate control circuits 148 interface with the above-described components. The control circuits, in turn, are monitored or driven by a suitable computer 154. The computer 154 includes conventional input/output devices, such as a keyboard 156, a terminal display screen 158, and/or a printer (not shown). Additional devices 160, such as a non-volatile memory (e.g., disk or tape memory) may also be coupled to the computer 154, as required, in order to facilitate operation of the system to collect and/or retrieve or track the historical data that may be needed to assure a fast and reliable system performance relative to detection of various contraband. For example, it is contemplated that one such additional device 160 that may be coupled to the main computer 154 is an auxiliary computer, adapted specifically to interface with personnel who operate the detection equipment.

In operation, the object 134 is irradiated by the beam 132 in sections or slices as the object moves past the beam. The gamma-rays resulting from the interaction of the neutrons with atomic nuclei in the irradiated slices of the object are detected in the gamma-ray detector array 144. The intensity of the neutrons that pass through the chamber 135 and object 134 are measured by the neutron detector 146. The number of gamma-rays of specified energies detected by each detector in the array provide a measure of the amount of the particular element present within the irradiated voxel of the object. By combining this information from all of the detectors, as well as by considering the number of neutrons that pass through the object (fluence of neutrons), both spatial and density distributions of the particular elements within the irradiated object are obtained. (Note, as used herein, "spatial" distribution refers to the location of a particular element(s) within a defined space. A "density" distribution refers to the amount of a particular element that is present at a given location within the given space.) Such spatial and density information thus allows a three-dimensional spatial and density image of the elemental (nuclear) constituents of the object to be derived. The nuclear spatial and density information thus obtained may be further enhanced by combining it with the electron density information obtained from the X-ray system 150. If such combined spatial and density information suggests the presence of contraband, the object is flagged for further investigation (e.g., diverted off of the conveyor belt for a manual search).

As indicated in FIG. 4, it is preferred that the neutron beam 132 be directed toward the interrogated object 134 using a collimator 136. The collimator 136 may be of conventional design, and is comprised of neutron scattering, and absorbing materials of densities that ensure a desired tailoring of the cross section of the beam, including the reduction of the neutron flux impinging on the gamma-ray detectors. The gap of the collimator thus defines, e.g., a narrow fan-shaped beam of source neutrons that bombard a known section or volume element, i.e., of the interrogated object. The use of, e.g., several collimators 136 advantageously allows a set of fan-shaped neutron beams to be generated, thus facilitating the building of independent irradiation stations and assuring greater economy of the source neutrons, if so desired. Further, by directing the shaped beam only to a desired section or voxel of the object, the neutron irradiation is maintained more homogeneous throughout the section or voxel than would be possible if the unrestricted neutron beam irradiated the entire object.

Figure 5A:
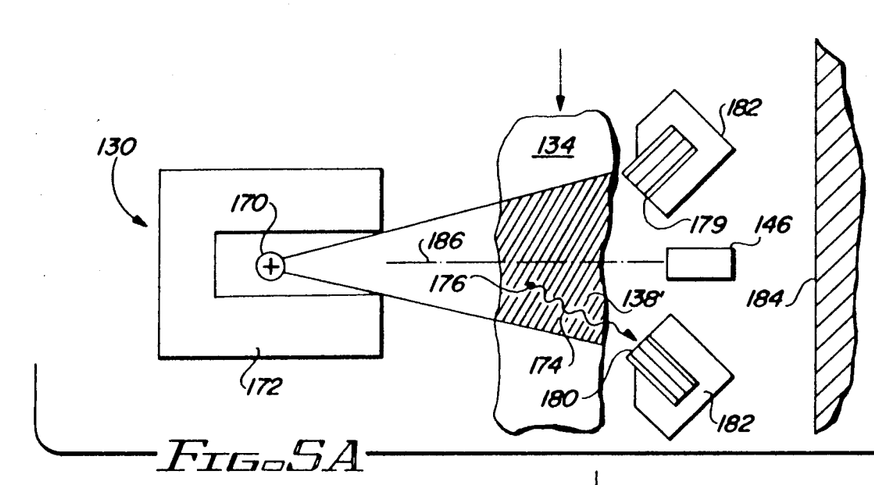
FIGS. 5A and 5B schematically illustrate the basic components of the nuclear-based detection system of the present invention, which components are used to interrogate objects suspected of containing contraband using gamma-ray spectroscopy based on the inelastic scattering of fast neutrons, with the embodiment in FIG. 5A not including a narrow collimator, and the embodiment in FIG. 5B including such a collimator.
Figure 5B:
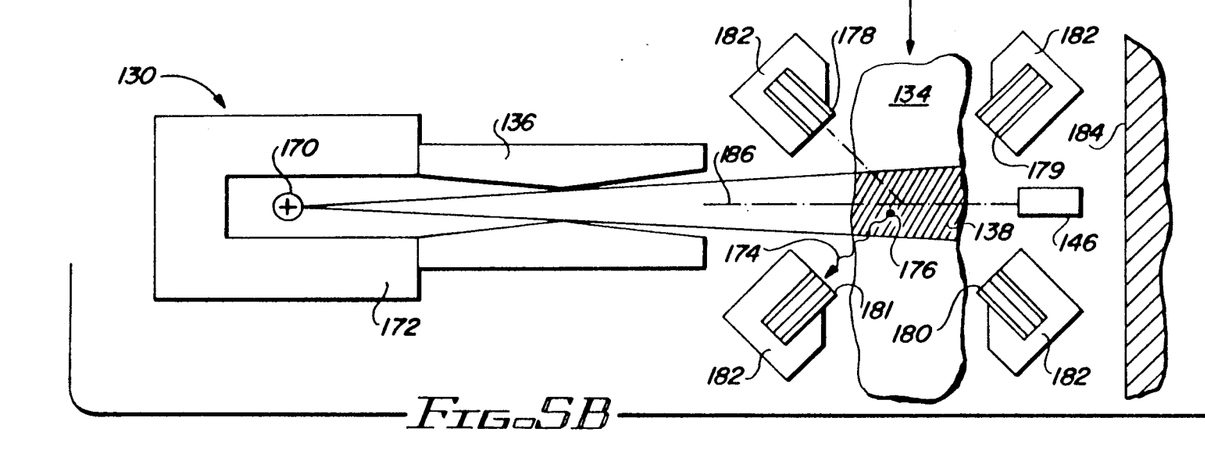

FIGS. 5A and 5B, show schematic illustrations of two embodiments of the basic components used by the nuclear-based portion of the present invention. The embodiment of FIG. 5B includes a neutron beam collimator 136, while the embodiment of FIG. 5A provides almost no collimation. The latter may be inferior to the former in spatial definition, but requires a weaker neutron source. Except for that difference, the two embodiments are essentially the same and will thus be described jointly. It is noted that like parts or elements of FIGS. 5A and 5B utilize the same reference numerals as like parts or elements of FIG. 4.

In FIGS. 5A and 5B, the neutron source 130 comprises a fast neutron generator 170 surrounded by a biological shield 172. The neutron source may be any of several commercially available generators of fast neutrons, e.g., a D+T (deuterium plus tritium) generator, such as the model A711 generator made by Kaman Nuclear of Colorado, the TN46 or TN26 neutron generators made by Sodern (France), or any other suitable neutron generator, such as a D+D (deuterium plus deuterium) generator, a D+Be (deuterium plus beryllium) generator, or a H+Li (light hydrogen plus lithium) generator. The biological shield 172 is used to shield operating personnel from radiation that may be potentially harmful. It may be made from any of several suitable substances, commonly known and used for shielding in the nuclear art, and is typically a composite material made of several substances, such as boron wax, polyethylene, and heavy metal (e.g., lead, bismuth, or tungsten).

As previously described, the collimator 136, when used (FIG. 5B), forms the beam 132 of neutrons into a desired cross sectional shape. Preferably, this will be a fanned shape (out of the drawing plane in FIGS. 5A and 5B) that ensures irradiation of a desired volume 138 (shown in cross-hatch) of the object 134. Even where the collimator is not used (FIG. 5A), the shielding 172 still limits the irradiated front area of the object 134 so as to define a somewhat predictable volume slice or portion 138'. The wavy arrow 174 schematically shows the path of the gamma-rays that result from neutron interaction at point 176 in the irradiated volume 138 of the object 134.

A plurality of detectors 178, 179, 180 and 181 are schematically shown in FIGS. 5A and/or 5B as representative of the detectors that are included in the detector arrays 144 used with the present invention. In a preferred embodiment, these detectors are gamma-ray scintillation detectors that surround the object 134 under investigation. Preferably the detectors 178 and 181 are either stacked (out of the plane of the drawing) in arrays that form two C-shaped rings; or in two O-shaped rings, in which case the detectors 178 and 180 are included in the same O-shaped ring, as are the detectors 179 and 181. Each of the detectors 179-181 is surrounded by an appropriate detector shield 182. Alternatively, arrays of detectors may be used that form straight bars, positioned, e.g., behind the object. Further, it is mandatory for radiological reasons that the entire facility be shielded with an additional biological shield 184.

As indicated above in FIGS. 4, 5A and 5B, the prompt gamma-ray lines that ensue from irradiation of the object 134 with fast neutrons are measured by gamma-ray detectors. In embodiments of the present invention directed to the detection of explosives, scintillators are used as the gamma-ray detectors. For example, one type of scintillator that may be used to detect gamma-rays is an inorganic scintillator crystal, such as sodium iodide (NaI(T1)) or bismuth germanate (BGO). Advantageously, scintillator detectors provide satisfactory spectral resolution in measurements of gamma-ray lines that indicate explosives, as indicated in Table 1 and FIG. 2. In accordance with that which has been learned by the applicants of the present invention from experiments carried out with 14 MeV neutrons in realistic conditions, the preferred set of spectral lines, i.e., the spectral lines that comprise the signatures of explosive constituents, include lines 2, 3, 8, 9, and 10. See FIG. 2.

An important feature of the present invention is the ability of the processing circuitry, included in the control circuits 148 and the computer 154 (FIG. 4) to generate or create three-dimensional images of the density distributions of specified constituents of the contraband of interest. For example, where the contraband is explosives, three-dimensional (3-D) images of the explosive constituents H, C, N, and O contained within the object 134 are obtained. These distributions are obtained from the measurements of the signature gamma-ray lines which originate in the geometrically well-defined small volume elements (voxels) of the irradiated object 134. This 3-D mapping is achieved by utilizing the well known effect of the combined solid-angle and detection efficiency of finite size scintillation crystals, i.e., suitably choosing the sizes and shapes of the crystals, their positions versus the voxels, the opening gap of the neutron beam collimator, and the stepwise or continuous motion of the object relative to the neutron beam used to ensure its complete and homogeneous inspection.

As is known to those skilled in the nuclear arts, a scintillator is any material capable of emitting low energy photons (in the visible and near visible range) when high energy radiation, e.g., gamma-rays, interacts therewith. In the case where an inorganic scintillator crystal, such as NaI, is used, a faint visible light results when the crystal is struck with a gamma ray. This light is converted to an electrical pulse by a photomultiplier tube. The voltage of the pulse is proportional to the energy of the gamma ray. Thus, the processing circuitry used with the scintillator detector array(s) of the present invention must be capable of measuring and counting the pulses, and hence the gamma-rays. Several problems are encountered in performing this task, especially if the count rates are high. These problems, and a preferred solution thereto, are described in Drndarevic, et al., "A Signal Processor for High Counting Rate Gamma Ray Spectroscopy with NaI(T1) Detectors," *IEEE, Proceedings of Nuclear Science* (February 1988), which article is incorporated herein by reference.

Using pulse handling circuits such as those described in the referenced article, count rates greater than $10^5$ Hz may be used. Such high count rates advantageously permit prompt elemental analysis of the object to be performed, thereby maintaining a suitable fast throughput for the contraband detection system.

A further feature of the present invention is to include one or more neutron detectors 146 in addition to the gamma-ray detectors included in the detector array(s) 144. The use of such a neutron detector(s) enables the measurement of the flux of fast neutrons at the detector position(s). In turn, such neutron flux measurement provides an indication of the density of the atomic nuclei of the material through which the neutrons have passed. Combining this density information for all of the voxels of the irradiated object thus allows a three dimensional image of the nuclear density of the object to be performed, as is commonly done while performing neutron radiography. This neutron radiography image may be combined with the three dimensional image of the density of the constituent elements of the object obtained from the gamma ray detectors. When such images are further combined with the two-dimensional electron density image obtained from the conventional X-ray system 150, the probability of detecting specified contraband (without falsely alarming on benign materials) is significantly enhanced.

In one embodiment of the present invention, the investigated moving object 134 is interrogated in a "once-through-pass" of the object through the irradiating cavity 135. In another embodiment, the investigated moving object 134 is interrogated in a double irradiation regime with interchanged top-bottom sides.

As indicated in FIG. 4, the present invention utilizes various electronic sensors or controls and processing circuits 148 to perform its function of irradiating an object and analyzing the resulting radiation to determine its constituent elements and their distribution. In order to illustrate the organization of the corresponding software used in the computer 154 to interface with such control and/or processing circuits, reference is next made to FIG. 6 where there is shown a schematic diagram showing one example of the flow of data and controls used in the embodiments of the present invention.

Figure 6:
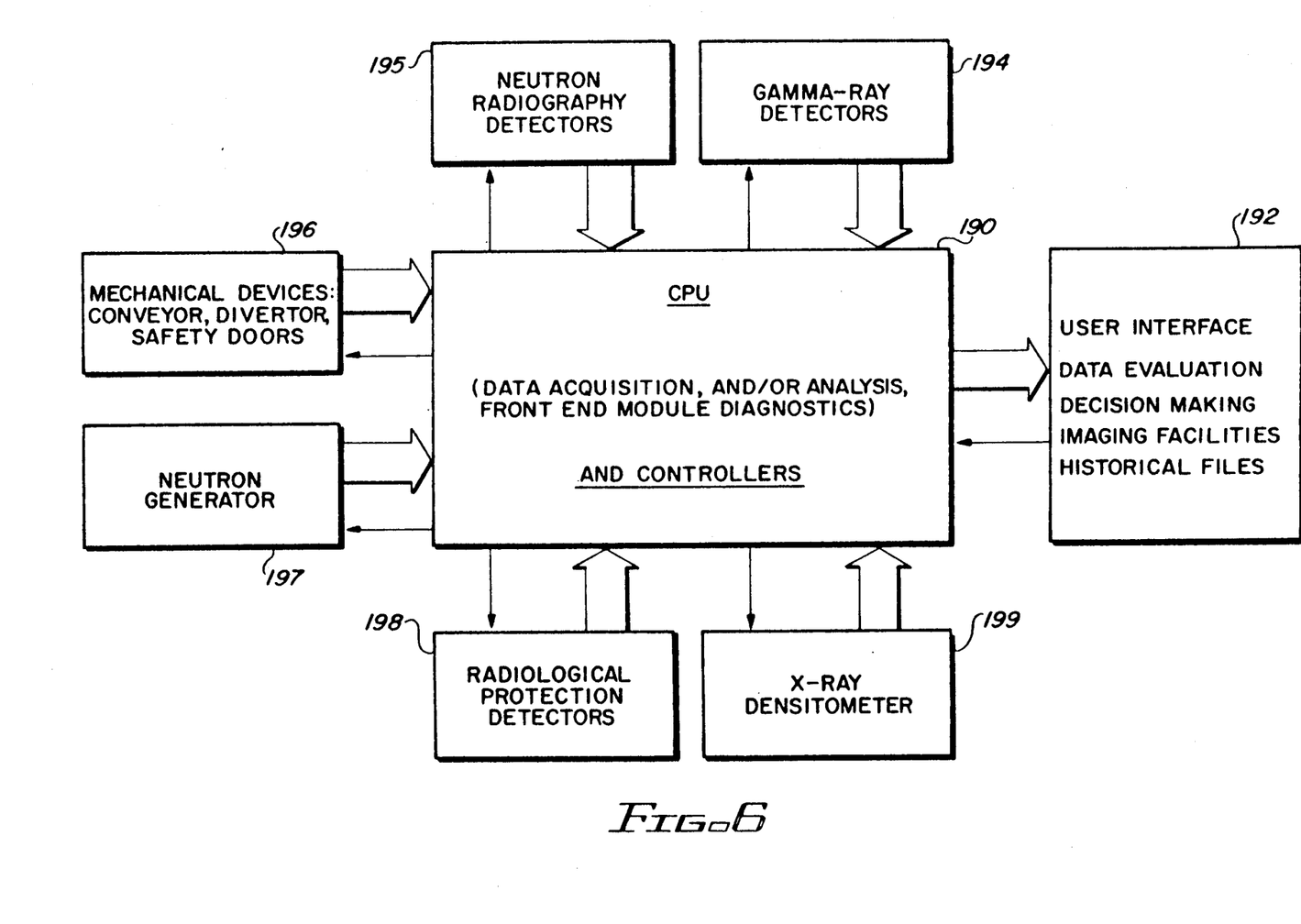
FIG. 6 is a schematic diagram showing one example of the flow of data and controls used in the embodiments of the present invention.

A central processing unit (CPU) module 190 resides at the heart of the contraband detection system. Once valid signals from the detectors and sensors have been acquired, the CPU module 190 carries out or controls the analysis of the data from the detectors/sensors. It then delivers the results to module 192, which is dedicated to data merging and decision making. For decision making, module 192 uses the method of Statistical Discriminant Analysis, or an Artificial Neural System (ANS), e.g., an electronic neural network, as described, e.g., in applicants' copending and commonly owned U.S. patent application, Ser. No. 07/367,534, filed 06/16/89, which application is incorporated herein by reference. CPU module 190 further issues the signals that control the subsystems, i.e., modules 194–199.

Module 194 in FIG. 6 represents the gamma-ray detectors, e.g., the detectors 178–181 (FIGS. 5A and 5B), and includes circuitry that governs the electronic signals from the gamma-ray detectors and the various control circuits that adjust and monitor the electrical settings of these detectors.

Module 195 represents the circuitry, including controls, associated with the standard or position sensitive neutron detector(s), such as the neutron detector(s) 146 (FIGS. 4, 5A and 5B), used to perform neutron radiography analysis of the object under investigation.

Module 196 represents the actuators and controls or mechanical devices used with the present invention, e.g., the conveyor belt drive motor 142, diverters, and safety doors. Diverters are used to divert objects off of the conveyer belt when a determination is made that the object contains specified contraband. Safety doors are used to protect operating personnel from radiation that might otherwise escape from the irradiation room.

Module 197 represents the neutron generator 130, and the various control circuits used to control the operation of the neutron generator 130.

Module 198 represents the systems radiological controls, i.e., those controls used throughout the system to ensure the system is safe for operating personnel, and that the induced radioactivity in the interrogated items is not exceeding prescribed levels. Such radiological controls are standard in the nuclear industry.

Module 199 represents an optional conventional X-ray subsystem, such as the X-ray system 150 shown in FIG. 4, that provides digitized images of electron density distributions in the object.

Module 192 contains the software that supports the final data analysis and decision regarding the character of the contents of the object under investigation. This module facilitates e.g., construction of the 3-D image of distributions of H, $^{12}$C, $^{14}$N, and $^{16}$O nuclei, and merging these nuclear density distributions with the electron density maps obtained with the X-ray subsystem module 199, and with the radiographs obtained with the neutron radiography detectors 195. In addition, module 192 provides a means whereby the user can interact with the system, and provides a means for status displays and the updating of historical record files.

Advantageously, the present invention may include multiple processors within the CPU module 190, the data evaluation module 192, or any other modules shown in FIG. 6, which multiple processors are designed to operate in parallel, thereby significantly reducing the processing time required to perform an analysis of a given object. In turn, such reduced processing time further allows the rate at which objects can be passed through the contraband detection system (the "throughput" rate) to be increased.

It is further noted that the use of parallel processors also allows some functions of the indicated modules to be combined or omitted, and the data and control parts to be rerouted or deleted. Hence, it is to be understood that the system organizational diagram shown in FIG. 6 is not necessarily the only scheme of data and/or control flow in the embodiments of the present invention, as numerous alternative and/or equivalent schemes could readily be fashioned by those skilled in the art.

Relevant details associated with combining the data obtained from an X-ray system with the nuclear density distribution data obtained from the gamma-ray detectors, as well as suggested configurations for efficiently operating the detection system (e.g., by using two computers coupled together through an Ethernet network) may be found in applicants' copending and commonly owned patent application, Multi-Sensor Explosive Detection System (Ser. No. 07/463,036 now U.S. Pat. No. 5,078,952), filed herewith, which application is incorporated herein by reference.

As thus described, it is seen that the contraband detection system of the present invention provides a nuclear-based non-invasive detection system that accurately and rapidly determines the presence of concealed contraband, such as explosives, within a closed object. In particular, for the disclosed embodiment, the detection system accurately identifies the presence of one or more of the elements hydrogen, oxygen, carbon and/or nitrogen, and/or other elements (e.g., chlorine); and further generates an image of the three-dimensional density distribution of such elements, or otherwise provides information on the spatial and density distributions of such elements, within the object being investigated. Such an image advantageously allows contraband to be detected regardless of the shape that the contraband assumes within the object. By including within the system both gamma-ray and neutron detectors, as well as a conventional X-ray system, it is thus possible for the system to exhibit a high probability of detecting specified contraband, while at the same time ensuring a low probability of false alarms, all while maintaining a high throughput of objects therethrough. Such system is easy and safe to operate; and, as it turns out, is non-hazardous to the interrogated objects, operating personnel, and the environment.

While the invention herein disclosed has been described by means of specific embodiments and applications thereof, numerous modifications and variations could be made thereto by those skilled in the art without departing from the scope of the invention set forth in the claims.

What is claimed is:

1. A method of detecting contraband within an object under investigation comprising:
   generating a beam of fast neutrons;
   irradiating said object with said beam of fast neutrons, said fast neutrons interacting with atomic nuclei of the elements contained within said object to produce a gamma-ray spectrum having spectral lines characteristic of the elements contained within said object;
   measuring the spectral lines of said gamma-ray spectrum using a multiplicity of gamma-ray detectors judiciously positioned around said object;
   detecting the number of neutrons that pass through said object without interacting substantially with atomic nuclei within said object;
   determining the spatial and density distributions of the atomic nuclei of the elements contained within said object from the measured gamma-ray spectrum obtained from said multiplicity of gamma-ray detectors and the number of neutrons that pass through said object;
   comparing the measured spatial and density distributions of the atomic nuclei of the elements within said object with known spatial and density distributions of atomic nuclei for elements characteristic of contraband; and
   determining that contraband is present within said object when said comparison indicates a substantial match.

2. The method as set forth in claim 1 wherein the step of measuring the spectral lines of the gamma-ray spectrum includes determining the approximate origin within said object of the gamma-rays that comprise said measured spectral lines of gamma-rays based on the location of a particular detector within said multiplicity of gamma-ray detectors that detects said gamma rays; and, in combination with the number of neutrons that pass through said object without interacting substantially with any intervening atomic nuclei, formulating therefrom an approximate spatial and density distributions of the atomic nuclei of the elements contained within said object.

3. The method as set forth in claim 2 wherein the step of irradiating said object with said beam of fast neutrons comprises passing said object in front of said beam of fast neutrons.

4. The method as set forth in claim 3 further including collimating said beam of fast neutrons to a desired cross-sectional shape prior to irradiating said object therewith.

5. The method as set forth in claim 4 further including controlling said desired cross-sectional shape to examine a desired voxel of said object as said object is passed in front of said beam.

6. The method as set forth in claim 4 wherein the step of measuring said spectral lines comprises determining the presence of at least one spectral line attributable to the presence of at least one element from the group hydrogen, carbon, nitrogen and oxygen.

7. The method as set forth in claim 6 further including determining the presence of spectral lines attributable to the presence of chlorine within said object.

8. A method of detecting contraband in an object under investigation comprising:
- generating a collimated beam of fast neutrons;
- irradiating at least one section of said object with said collimated beam of fast neutrons, said fast neutrons interacting with atomic nuclei within said irradiated section to produce a gamma-ray spectrum having spectral lines characteristic of the elements contained within said at least one irradiated section;
- measuring the gamma-ray spectrum produced by said irradiation by detecting gamma-rays originating within said at least one section using a multiplicity of gamma-ray detectors judiciously positioned around said object;
- measuring the neutron flux that passes through said at least one section, said neutron flux comprising the number of neutrons that pass through said at least one section without interacting substantially with atomic nuclei;
- determining whether said measured gamma-ray spectrum and neutron flux indicate the combined presence of at least a plurality of elements from the group of elements consisting of hydrogen, carbon, nitrogen, and oxygen; and, if so
- identifying said at least one section as one that possibly contains contraband.

9. The method as set forth in claim 8 wherein the step of determining whether said measured gamma-ray spectrum and neutron flux indicate the combined presence of at least a plurality of hydrogen, carbon, nitrogen or oxygen includes determining the spatial and density distributions of the various elements present within said at least one section, and analyzing said spatial and density distributions to help identify the presence of contraband within said at least one section.

10. The method as set forth in claim 9 further including obtaining an electron density image of said at least one section within said object, and using said electron density image to further aid in identifying the presence of contraband within said at least one section.

11. The method as set forth in claim 8 wherein the step of determining whether said measured gamma-ray spectrum indicates the combined presence of at least a plurality of hydrogen, carbon, nitrogen or oxygen includes determining whether said measured gamma-ray spectrum contains spectral lines having energies of approximately 2.2, 2.3, 4.4, 5.1 and 6.1 MeV.

12. Apparatus for detecting a prescribed contraband material within an object under investigation comprising:
- means for generating high energy neutrons;
- means for irradiating said object with said high energy neutrons, said neutrons interacting with the nuclei of atoms of elements contained within said object, thereby causing gamma rays having a characteristic energy to be emitted, said characteristic energy uniquely identifying a particular element from which the gamma ray is emitted, the number of emitted gamma rays of a particular characteristic energy being a function of the spatial and density distributions of the corresponding particular element within said object;
- means for detecting the number of gamma rays emitted from the object at a plurality of prescribed characteristic energies, said means including a multiplicity of gamma-ray detectors judiciously positioned around said object;
- means for detecting the number of neutrons that pass through said object without interacting substantially with atomic nuclei of the elements within said object, the number of said passed-through neutrons providing an inverse measure of the density of atomic nuclei within said object;
- said gamma ray and neutron detection means thereby providing a measure of the spatial and density distributions of a corresponding plurality of elements within said object; and
- means for determining whether the measured spatial and density distributions of said plurality of elements corresponds to said prescribed contraband material;
- whereby the presence of said prescribed contraband material within said object can be detected.

13. Apparatus as set forth in claim 12 wherein said gamma ray detecting means includes means for detecting a particular portion of said object from which a particular gamma ray originates, said determining means providing mapping means for generating a map of the densities of said plurality of elements within said object, said map providing an indication of the density distribution of said plurality of elements within said object, said density distribution thereby providing an indication of the relative shape of a material within said object containing said plurality of elements.

14. Apparatus as set forth in claim 13 wherein said mapping means includes means for generating a map of the spatial distributions of said plurality of elements within said object.

15. Apparatus as set forth in claim 13 wherein said mapping means includes means for generating an X-ray image of said object.

16. Apparatus as set forth in claim 12 wherein said neutron beam generating means generates neutrons having an energy greater than 6.7 MeV.

17. Apparatus as set forth in claim 16 wherein said prescribed energies of the gamma rays detected by said detecting means correspond to the presence within said object of at least two of the following elements: nitrogen, carbon, oxygen, and hydrogen.

18. Apparatus as set forth in claim 16 wherein said prescribed energies of the gamma rays detected by said detecting means are 2.2, 2.3, 4.4, 5.1, and 6.1 MeV.

19. Apparatus as set forth in claim 12 wherein said beam directing means includes means for scanning said object with said beam.

20. Apparatus as set forth in claim 16 wherein said means for generating high energy neutrons includes means for forming a beam of said high energy neutrons and means for moving said object through said beam.

21. Apparatus as set forth in claim 20 wherein said means for forming said beam of high energy neutrons includes collimator means for directing said beam at a prescribed section of said object as said object moves through said beam.

22. Apparatus as set forth in claim 21 wherein said collimator means directs said beam at a narrow slice of said object as said object moves through said beam.

23. Apparatus as set forth in claim 22 wherein said multiplicity of gamma-ray detectors comprise an array of detectors, each detector of said array being selectively positioned to detect gamma rays emitted from the prescribed section of said object irradiated with said neutron beam.

24. Apparatus as set forth in claim 23 wherein said array of detectors include scintillation crystals coupled to photomultipliers.

25. Apparatus for non-invasively detecting contraband in an object under investigation comprising:
means for generating fast neutrons;
means for irradiating a prescribed portion of said object with said fast neutrons, the interactions of said fast neutrons with atomic nuclei within said irradiated portion of said object giving rise to a gamma-ray spectrum having spectral lines that comprise a unique signature of the nuclear species contained in said irradiated portion of said object;
means for measuring the spectral lines of said gamma-ray spectrum to determine spatial and density distributions of the atomic nuclei of the elements that are contained within said irradiated portion of said object, said spectral line measuring means including a multiplicity of gamma-ray detectors selectively positioned relative to said object so as to sense gamma-rays emitted therefrom;
neutron detection means positioned behind said object for detecting fast neutrons that pass through the irradiated portion of said object without interacting substantially with atomic nuclei therein, the number of fast neutrons that detected providing an additional measure of the spatial and density distribution of atomic nuclei within the irradiated portion of said object; and
means for determining whether said spatial and density distributions of atomic nuclei correspond to contraband.

26. Apparatus as set forth in claim 25 wherein said multiplicity of gamma-ray detectors are positioned relative to said object so that the number of gamma-rays detected by each detector combine to provide a three dimensional map of the atomic nuclei distribution contained in said object.

27. Apparatus as set forth in claim 26 further including
means for collimating said fast neutrons in a beam of a desired shape; and
means for controllably moving the object being irradiated in front of said collimated beam so that only desired portions of said object are irradiated by said beam at any given instant of time.

28. Apparatus as set forth in claim 27 wherein said collimating means collimates said beam of fast neutrons into a fan beam having a rectangular cross section, said rectangular cross section being wide in a first dimension and narrow in a second dimension, said fan beam thereby irradiating a narrow slice of said object as said object moves in front of said beam, the number of gamma-rays detected by each detector at any given instant of time combining to provide a three dimensional map of the atomic nuclei distribution contained in the irradiated slice of said object.

29. Apparatus as set forth in claim 28 wherein said moving means moves said object in front of said collimated beam at a constant speed.

30. Apparatus as set forth in claim 28 wherein said moving means moves said object in front of said collimated beam with a stepwise motion.

31. Apparatus as set forth in claim 25 wherein said means for measuring the spectral lines measures spectral lines that evidence the presence within said object of a plurality of elements characteristic of contraband, said plurality of elements belonging to the group comprising hydrogen, carbon, nitrogen and oxygen.

32. Apparatus as set forth in claim 26 further including means for producing an electron density map of the object under investigation, said electron density map and said atomic nuclei distribution map both providing information to said determining means for determining the presence of contraband within said object.

33. Apparatus as set forth in claim 32 wherein said determining means comprises electronic processing means for automatically comparing the nuclear distribution map and the electron density map obtained from the object under investigation with known corresponding maps of prescribed contraband, and for providing an indication whenever said comparison indicates a substantial match therebetween.

34. Apparatus as set forth in claim 33 wherein said electronic processing means includes an electronic neural network trained to distinguish the nuclear distribution maps and electron density map of contraband from corresponding maps of non-contraband.

35. Apparatus as set forth in claim 34 wherein the object under investigation comprises airline baggage and the contraband being detected comprises explosives.

* * * * *